United States Patent
Ranganathan et al.

(10) Patent No.: US 7,305,045 B2
(45) Date of Patent: Dec. 4, 2007

(54) LOW VOLTAGE SWING PAD DRIVER AND RECEIVER

(75) Inventors: Sumant Ranganathan, San Jose, CA (US); Tom W. Kwan, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 10/926,212

(22) Filed: Aug. 25, 2004

(65) Prior Publication Data

US 2005/0036562 A1 Feb. 17, 2005

Related U.S. Application Data

(63) Continuation of application No. 10/195,966, filed on Jul. 16, 2002, now Pat. No. 6,801,577.

(60) Provisional application No. 60/351,708, filed on Jan. 24, 2002.

(51) Int. Cl.
*H04L 27/00* (2006.01)

(52) U.S. Cl. .................. 375/295; 375/270; 375/316

(58) Field of Classification Search ............. 330/250, 330/255; 455/142; 375/257, 296, 258, 295, 375/316, 270; 341/155–158, 163, 161, 164, 341/169

See application file for complete search history.

(56) References Cited

U.S. PATENT DOCUMENTS

| | | | | |
|---|---|---|---|---|
| 5,208,846 A | * | 5/1993 | Hammond et al. | 379/9.06 |
| 5,214,390 A | * | 5/1993 | Montreuil | 329/309 |
| 5,473,666 A | * | 12/1995 | Szczebak et al. | 379/3 |
| 5,526,164 A | * | 6/1996 | Link et al. | 398/195 |
| 5,632,272 A | * | 5/1997 | Diab et al. | 600/323 |
| 5,687,195 A | * | 11/1997 | Hwang et al. | 375/345 |
| 6,310,953 B1 | * | 10/2001 | Yoshida et al. | 379/399.01 |
| 6,320,072 B1 | * | 11/2001 | Ueda et al. | 562/431 |
| 6,374,097 B1 | * | 4/2002 | Kudou | 455/232.1 |
| 6,801,577 B2 | * | 10/2004 | Ranganathan et al. | 375/257 |
| 2003/0048099 A1 | * | 3/2003 | Miyagawa et al. | 324/76.79 |

* cited by examiner

*Primary Examiner*—Linh V. Nguyen
(74) *Attorney, Agent, or Firm*—Garlick Harrison & Markison; Shayne X. Short

(57) ABSTRACT

Low voltage swing pad driver and receiver. A transmitter portion and a receiver portion are implemented within various devices that communicate using low voltage swing pads communicatively coupled via a trace. The transmitter portion of one device generates a current signal that is pushed/pulled to a low voltage swing pad and is then passed across the trace to another low voltage swing pad. The transmitter portion includes a current driver that outputs the current signal to the low voltage swing pads, and the receiver portion includes a trans-impedance amplifier that transforms the received current signal into a voltage signal. The low voltage swing pad driver and receiver generates a relatively low voltage swing when compared to CMOS full-scale voltage swings thereby significantly reducing the possibility of introducing any noise and/or distortion of data that is communicated via the interface.

20 Claims, 12 Drawing Sheets

LOW VOLTAGE SWING PAD DRIVER AND RECEIVER

CROSS REFERENCE TO RELATED APPLICATIONS

The present U.S. Utility patent application is a continuation of and claims priority pursuant to 35 U.S.C. § 120 to U.S. Utility patent application Ser. No. 10/195,966, entitled "LOW VOLTAGE SWING PAD DRIVER AND RECEIVER," filed Jul. 16, 2002, now U.S. Pat. No. 6,801,577, which is hereby incorporated herein by reference in its entirety and made part of the present U.S. Utility Patent Application for all purposes.

The U.S. Utility patent application Ser. No. 10/195,966 claims priority pursuant to 35 U.S.C. § 119(e) to U.S. Provisional Patent Application Ser. No. 60/351,708, entitled "LOW VOLTAGE SWING PAD DRIVER AND RECEIVER," filed Jan. 24, 2002, now abandoned, which is hereby incorporated herein by reference in its entirety and is made part of the present U.S. Utility Patent Application for all purposes.

TECHNICAL FIELD OF THE INVENTION

The invention relates generally to semiconductor devices; and, more particularly, it relates to communications between semiconductor devices.

BACKGROUND OF THE INVENTION

Semiconductor devices have long been under continual development. Some of these development efforts have been largely geared towards seeking to improve the communications between these semiconductor devices. There is typically a large degree of undesirable coupling of signals between pads, traces, and devices within composite metal oxide semiconductor (CMOS) devices. The operating voltage levels of many CMOS devices involves employing a 0-3.3 Volt (V) swing; a 0-3.3 V level signal is employed to couple information from one device to another within many prior art CMOS device systems. This level of voltage may cause a high degree of interference for many of the neighboring high performance devices. This noise, undesirably coupled from the use of these relatively high CMOS voltage levels, will appear in the form of distortion, increased noise, and create data dependent errors within the system. This generates an undesirable feedback path within the system that will corrupt much data.

Particularly within high performance devices, this undesirable coupling of noise will induce significant deleterious effects within the overall system. These deleterious effects may surface in the form of distortion, increased noise, reduced data throughput, data errors, and other degradation in performance. One categorization of high performance devices would include those devices that operate having a signal to noise ratio (SNR)>90 dB and a total harmonic distortion (THD)>90 dB.

As an illustrative example within such a high performance device receive (RX) front-end, the analog to digital converter (ADC) output is usually observed to check on the performance of the system. If this output is sent off chip using standard digital composite CMOS output pads, then these pads become a strong source of signal-dependant substrate noise. Given the high gain through the RX signal path, a very small signal amount of coupling back into the signal inputs or the reference input of the ADC will undesirably create significant distortion in the final ADC output. The MSB (most significant bit) of the ADC output (in 2's complement form) represents the sign of the input data and has significant signal content. The bits after the MSB start to have less signal dependence progressing from the MSB to the LSB (least significant bit). These other bits hence can be considered more as sources of noise.

Further limitations and disadvantages of conventional and traditional systems will become apparent through comparison of such systems with the invention as set forth in the remainder of the present application with reference to the drawings.

SUMMARY OF THE INVENTION

Various aspects of the invention can be found in a low voltage swing pad driver and receiver. The present invention may be implemented in a variety of ways. At a basic level, the present invention is operable to minimize the voltage swing realized at pads that interface between various semiconductor devices. Undesirably voltage swing at such an interface may be a huge injector of noise into the semiconductor devices and system. A trace that communicatively couples devices is provided a current signal having a relatively low swing voltage. In certain embodiments, the maximum generated voltage swing of approximately ±100 milli-Volts (mV) is generated at an interface; this is a significant reduction compared to the typical voltage swing of 0-3.3 V that is employed at the interfaces of many CMOS semiconductor devices and systems. Within this description, a full-scale CMOS voltage swing of 0 V to 3.3. V (or shown as a 0-3.3 V) swing is often used. However, the present invention is also adaptable to other voltage scale conventions.

The use of the 0-3.3 V full-scale CMOS voltage is representative of one CMOS voltage range that may be used within the low voltage swing pad driver and receiver implemented in accordance with the present invention. If desired, the received current signal (having the low swing) may then afterwards be transformed into a full-scale CMOS level voltage signal of ±3.3 V. In a transmitter portion of a device, a voltage signal is converted into a current signal. This current signal is pushed/pulled to a pad and across a trace to another pad at another device. At the other device, this received current signal is transformed into a voltage signal. The use of a current signal to transmit information across a trace between devices significantly reduced the distortion within the devices. In one particular embodiment, the use of the current signal to transmit information significantly minimizes distortion for a high performance analog front-end (AFE). The low noise operation of the AFE, in being one of the first components within a device to receive a signal, will reduce the distortion and noise coupling into other functional components within a device and also to other devices within the system.

The present invention may be implemented within embodiments where a transmitter portion and a receiver portion are each included within a single device. In this way, both transmit and receive operations may be performed between devices in a relatively low noise manner. This will significantly reduce any introduction of noise and distortion within the device and/or within other devices within the system. In alternative embodiments, scrambling and de-scrambling may be performed in the transmitter and receiver, respectively, to provide an even further guarantee of the accuracy of the data transmitted via the low voltage swing pad interface between devices.

The transmitter portion may be implemented using a device employing a differential pair input to control a current driver. The receiver portion may be implemented using a trans-impedance amplifier to convert from a current signal to a voltage signal; a swinging/inverting comparator is then used to provide a digital output signal from the receiver portion.

One embodiment of the present invention is implemented within an AFE, located within an asynchronous digital subscriber line (ADSL) device, that includes a transmitter portion and a receiver portion that operate using low voltage swing pads in accordance with the present invention. In some embodiments, the ADSL device is a single, integrated semiconductor chip. A variety of other functionality may be included within the ADSL device, including a digital signal processor (DSP), other interfaces (including 10/100/Giga Ethernet interfaces and universal serial bus (USB) interfaces), without departing from the scope and spirit of the invention. When interfacing with these other functional components within the ADSL device may be performed at CMOS full-scale voltage levels, 0-3.3 V. Within the device, a greater level of isolation may be achieved within the functional components of the ADSL device. However, at external device to device interfaces that are implemented using the low voltage swing pad implementation, in accordance with the present invention, will help significantly reduce the distortion and noise induced within the AFE of the ADSL device.

Moreover, other additional functional blocks may be included such as scramblers and de-scramblers that are implemented to manipulate digital data to ensure an even higher degree of accuracy. Other operational functional blocks may precede the transmitter portion and follow the receiver portion without departing from the scope and spirit of the invention.

In addition, other aspects, advantages and novel features of the invention will become apparent from the following detailed description of the invention when considered in conjunction with the accompanying drawings.

BRIEF DESCRIPTION OF THE DRAWINGS

A better understanding of the invention can be obtained when the following detailed description of various exemplary embodiments is considered in conjunction with the following drawings.

DETAILED DESCRIPTION OF A PREFERRED EMBODIMENT

The present invention provides a much-improved interface between semiconductor devices. Whereas many CMOS devices operate using 0-3.3 V swing voltage signals at many device to device interfaces, the present invention is able to implement a relatively low voltage swing interface by employing current as the data transmitting signal. At a transmitter end, a voltage to current signal conversion is performed. At a receiver end, a current to voltage signal conversion is performed. The present invention may be implemented in a variety of ways. One embodiment involves operating low voltage swing pads within an AFE of an ADSL device. In some embodiments, the ADSL device is a single, integrated semiconductor chip. In addition, in some embodiments, the device or devices may include multiple pads such that each of a transmitter portion and a receiver portion each has a dedicated pad for transmitting and receiving data.

The low voltage swing pad interface enables a substantial reduction of any distortion and noise within the device and/or system than is commonly introduced within most prior art devices that operate at the typical 0-3.3 V swing voltage signals at many device to device interfaces. Additional functional blocks may be included such as scramblers and de-scramblers that are implemented to manipulate digital data to ensure an even higher degree of accuracy. Other operational functional blocks may precede the transmitter portion and follow the receiver portion without departing from the scope and spirit of the invention.

Figure 1:
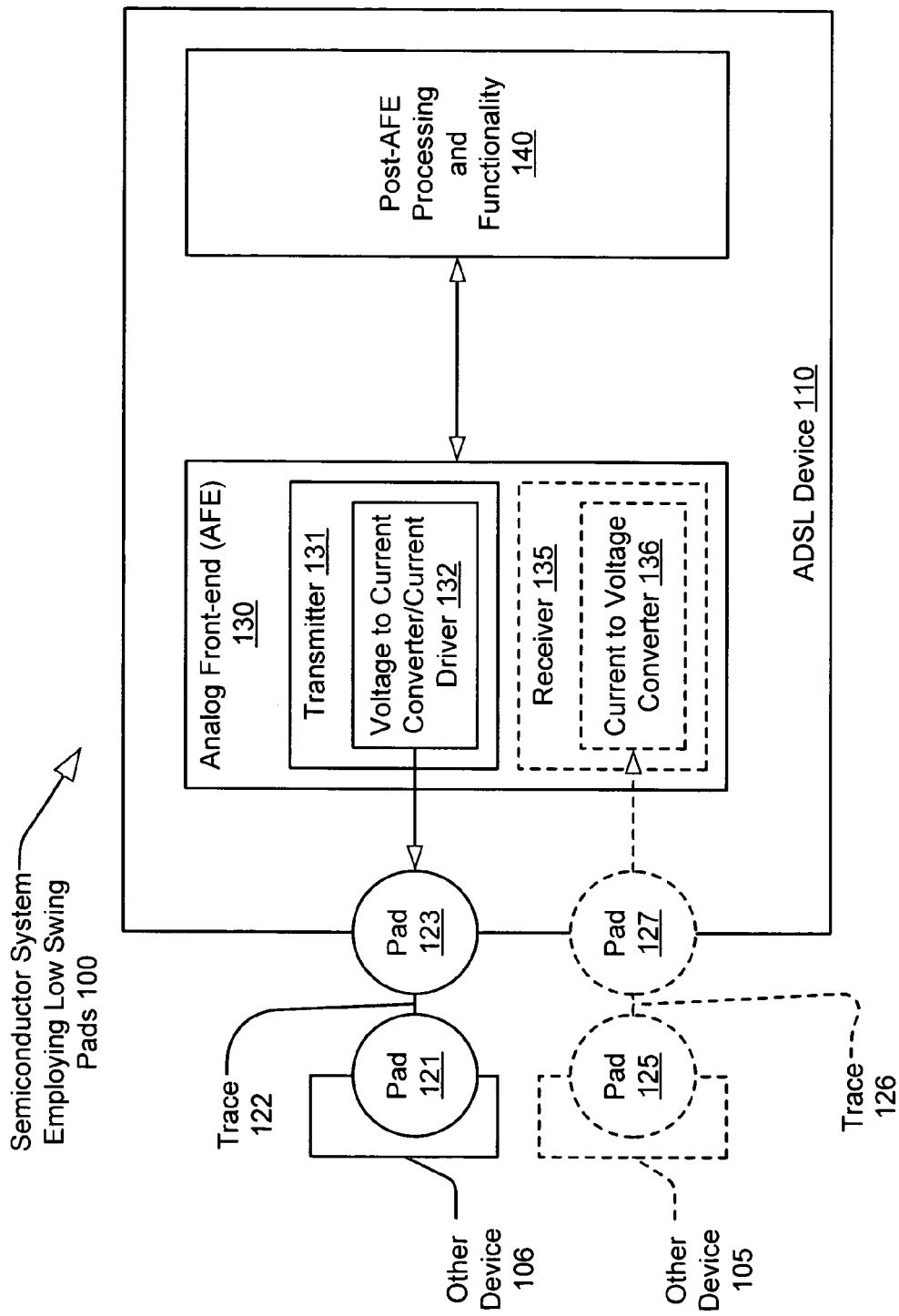
FIG. 1 is a system diagram illustrating an embodiment of a semiconductor system employing low swing pads that is built in accordance with certain aspects of the present invention.

FIG. 1 is a system diagram illustrating an embodiment of a semiconductor system employing low swing pads 100 that is built in accordance with certain aspects of the present invention. The semiconductor system employing low swing pads 100 is operable to perform transmit and/or receive functionality in various embodiments. The semiconductor system employing low swing pads 100 includes an ADSL device 110, and the ADSL device 110 includes an AFE 130. In some embodiments, the ADSL device 110 is a single, integrated semiconductor chip. The AFE 130 may include a transmitter 131 and/or a receiver 135 in various embodiments. The AFE 130 communicatively couples to subsequent, post-AFE processing and functionality as shown in a functional block 140. There are a variety of functional blocks and processing operations that may be performed within the post-AFE processing and functionality 140 without departing from the scope and spirit of the invention. Certain embodiments of the functionality and processing are described below within the FIG. 1 and other Figures as well.

An AFE 130 of the ADSL device 110 is operable to perform receive operations within the semiconductor system employing low swing pads 100. A receiver 135, located within the AFE of the ADSL device 110, is employed to perform the receive functionality. Another device 105 is communicatively coupled to a pad 125; the pad 125 communicatively couples to a pad 127 via a trace 126. The pad 127 communicatively couples to a receiver 135 within the AFE 130 of the ADSL device 110. The receiver 135 includes a current to voltage converter 136. There are a variety of ways in which the current to voltage converter 136 may transform the received current signal to a voltage signal without departing from the scope and spirit of the invention. The receiver 135 is able to provide a voltage signal that may be passed to the functional block 140 that is able to perform post-AFE processing and functionality.

The AFE 130 may also perform transmit functionality employing the transmitter 131. The transmitter 131, located within the AFE 130, employs a voltage to current signal/current driver 132 that is able to transform a voltage signal into a current signal that is pushed/pulled to a pad 123. The current signal is then passed from the pad 123 to a pad 121 via a trace 122 to another device 106.

The implementation of using the pads, in a low voltage swing pad embodiment, is able to provide for a maximum generated voltage swing of approximately ±100 milli-Volts (mV) at the interface shown as the pads 121 and 123 communicatively coupled via the trace 122 and also at the interface shown as pads 125 and 127 communicatively coupled via the trace 126. This is a significant reduction in voltage swing compared to the typical voltage swing of 0-3.3 V that is employed at the interfaces of many CMOS semiconductor devices and systems. If desired, the received current signal (having the low swing) may then afterwards be transformed into a full-scale CMOS level voltage signal of 0-3.3 V for use by other functional components. However, the most critical interfaces, namely the interfaces employed by the AFE 130, are ensured to receive a signal having significantly reduced noise and that will introduce significantly less distortion.

There are embodiments of the AFE 130 that include only one of the transmitter 131 or the receiver 135. However, the present invention also envisions embodiments where both the transmitter 131 and the receiver 135 are included within the AFE 130; in such embodiments, the AFE 130 is operable to perform both transmit and receive operations when communicating with other devices.

Figure 2:
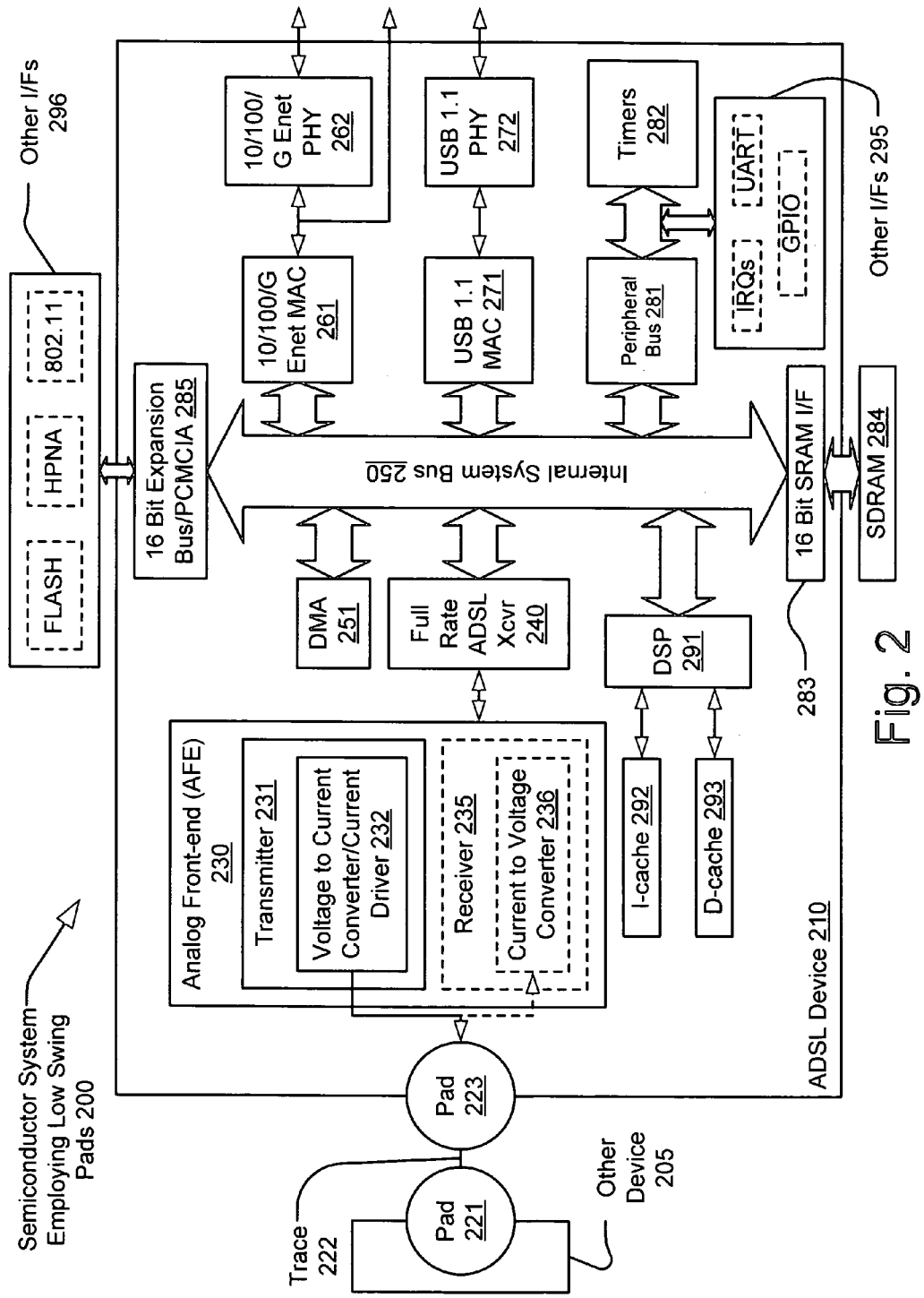
FIG. 2 is a system diagram illustrating another embodiment of a semiconductor system employing low swing pads that is built in accordance with certain aspects of the present invention.

FIG. 2 is a system diagram illustrating another embodiment of a semiconductor system employing low swing pads 200 that is built in accordance with certain aspects of the present invention. The semiconductor system employing low swing pads 200 may include a variety of devices; one device is an ADSL device 210. In some embodiments, the ADSL device 210 is a single, integrated semiconductor chip. The ADSL device 210 may also include a variety of functional blocks, including an AFE 230, a full rate ADSL transceiver (Xcvr) 240, a DSP 291, a 10/100/Giga Ethernet media access controller (MAC) 261, a 10/100/Giga Ethernet physical layer block (PHY), a USB 1.1 MAC 271, a USB 1.1 PHY 272, a peripheral bus 281, a number of timers 282, and other interfaces. Some of these interfaces 296 include FLASH, Home Phoneline Networking Alliance (HPNA), IEEE 802.11; these interfaces are serviced from an internal system bus 250 via a 16 bit expansion bus/Personal Computer Miniature Communications Interface Adapter (PCM-CIA) 285. Other interfaces 295 that are serviced via a peripheral bus 281, that is itself communicatively coupled to the internal system bus 250, may include interfaces to provide for interrupt request lines (IRQs), Universal Asynchronous Receiver Transmitters (UARTs), and general purpose input/ouputs (GPIOs).

The 10/100/Giga Ethernet protocol allows for communication as 10 mega-bits per second (Mbps), 100 Mbps, and 1000 Mbps (or 1 giga-bit per second=1 Gbps). The functionality of such an interface path is operable to provide Ethernet communication within both an 802.3 media independent interface (MII) and a 802.3 MDI (media dependent interface); the 802.3 MII coming out of the 10/100/Giga Ethernet PHY 262 and the 802.3 MDI coming out of the 10/100/Giga Ethernet MAC 261. In addition, the functionality of such an interface is operable to provide for USB communication via the USB 1.1 MAC 271 and the USB 1.1 PHY 272 as well. It is noted that particular versions of the Ethernet (10/100/Giga in this case) and the USB (1.1 in this case) are simply examples of the Ethernet and USB standards. Other versions of both of these standards may also be employed without departing from the scope and spirit of the invention. The present invention is also extendable to any of the Ethernet and USB standards. These particular versions are chosen to be illustrative and not exhaustive of the applicability of the present invention to such interface standards and protocols.

In operation, another device 205 communicatively couples a current signal to a pad 221; the pad 221 communicatively couples to a pad 223 via a trace 222. The pad 223 is communicatively coupled to the ADSL device 210. The pad 223 is operable to communicatively couple to the AFE 230. The AFE 230 includes a transmitter 231 and a receiver 235. In certain embodiments, only one of the transmitter 231 or the receiver 235 is implemented within the AFE 230. However, some embodiments include both the transmitter 231 and the receiver 235 to enable both transmit and receive functionality; in such cases, two separate pads may be used where one is for transmission and one is for receipt. The transmitter 231 employs a voltage to current converter/current driver 232 to be able to push/pull a current signal to the pad 223; the voltage to current converter/current driver 232 is able to convert a voltage signal to a current signal. In some embodiments, this current signal has a voltage swing of less than approximately ±100 mV. This is a significant reduction in voltage swing compared to the typical voltage swing of 0-3.3 V that is employed at the interfaces of many CMOS semiconductor devices and systems. If desired, the received current signal (having the low swing of approximately ±100 mV) may then afterwards be transformed into a full-scale CMOS level voltage signal of 0-3.3 V for use by other functional components within the ADSL device 210.

The receiver 235 is able to receive a current signal from the pad 223 and to transform it into a voltage signal using a current to voltage converter 236. Again, when receiving a signal using the low voltage swing pad functionality in accordance with the present invention, the received current signal has a voltage swing of less than approximately ±100 mV, a significant reduction in voltage swing compared to the typical voltage swing of 0-3.3 V that is employed at the interfaces of many CMOS semiconductor devices and systems.

The AFE 230 communicatively couples to the full rate ADSL Xcvr 240; the full rate ADSL Xcvr 240 communicatively couples to the internal system bus 250. A number of functional blocks within the ADSL device 210 also communicatively couple to the internal system bus 250. For example, the direct memory access (DMA) 251 is communicatively coupled to the internal system bus 250; the DSP 291 communicatively couples to the internal system bus 250 as well. I-cache 292 and D-cache 293 also communicatively couple to the DSP 291. The internal system bus 250 communicatively couples to an Ethernet interface path and a U.S.B interface path using the 10/100/Giga Ethernet MAC 261 and the 10/100/Giga Ethernet PHY 262 as well as the USB 1.1 MAC 271 and the USB 1.1 PHY 272, respectively. In addition, the peripheral bus 281 communicatively couples to the internal system bus 250, and the peripheral bus 281 communicatively couples to the timers 282. Moreover, the internal system bus 250 communicatively couples to a 16 bit static dynamic random access memory (SRAM) interface 283. The 16 bit SRAM interface 283 communicatively couples to synchronous random access memory (SDRAM) 284 located externally to the ADSL device 210. In addition, the internal system bus 250 communicatively couples to the 16 bit expansion bus/PCMCIA 285.

Additional variations of an ADSL device may be implemented without departing from the scope and spirit of the invention that is operable to employ low voltage swing pads on a high performance AFE to minimize distortion and noise thereby reducing interference, data error, and other deleterious effects within the device and system.

Figure 3:
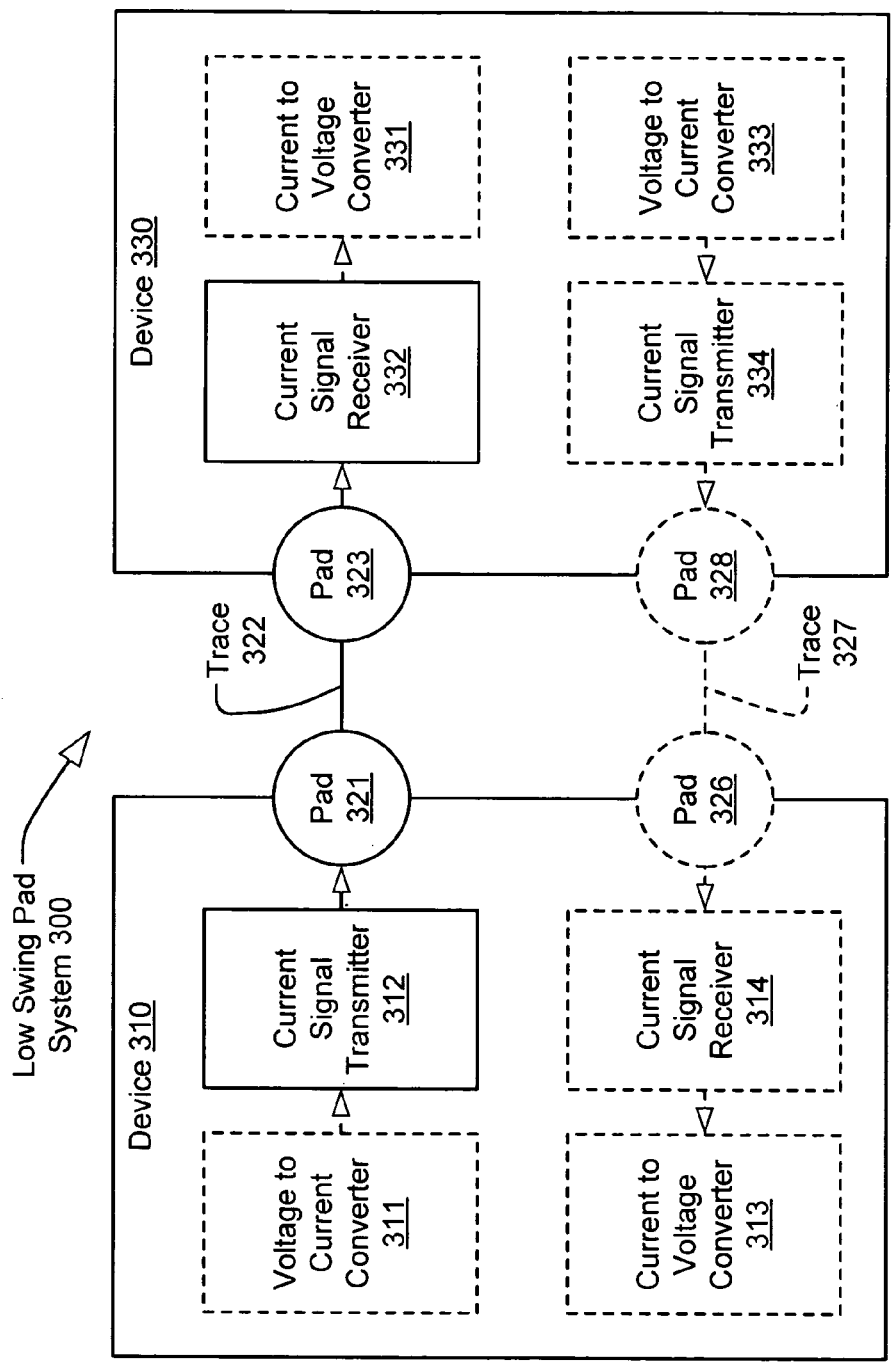
FIG. 3 is a system diagram illustrating an embodiment of a low swing pad system that is built in accordance with certain aspects of the present invention.

FIG. 3 is a system diagram illustrating an embodiment of a low swing pad system 300 that is built in accordance with certain aspects of the present invention. A device 310 communicatively couples to a device 330 via pads and traces. For communication from the device 310 to the device 330, the device 310 pushes/pulls a current signal to a pad 321 that passes the current signal to a pad 323 via a trace 322; the pad 323 is located at the device 330. Analogously, for communication from the device 330 to the device 310, the device 330 pushes/pulls a current signal to a pad 328 that passes the current signal to a pad 326 via a trace 327; the pad 326 is located at the device 330.

For transmission from the device 310, a current signal transmitter 312 provides the current signal to the pad 321. For transmission from the device 330, a current signal transmitter 334 provides the current signal to the pad 328. Within the device 310, for receipt of a current signal that has been transmitted from the device 330, a current signal receiver 314 is employed; the current signal receiver 314 is communicatively coupled to the pad 326. Within the device 330, for receipt of a current signal that has been transmitted from the device 310, a current signal receiver 332 is employed; the current signal receiver 332 is communicatively coupled to the pad 323.

In certain embodiments, the device 310 also includes a voltage to current converter 311. The voltage to current converter 311 converts a voltage signal into a current signal that may then be transmitted by the current signal transmitter 312 to the pad 321. In addition, the device 310 may also include a current to voltage converter 313 that is operable to convert a received current signal, received by the current signal receiver 314 via the pad 326, into a voltage signal.

Moreover, in alternative embodiments, the device 330 also includes a voltage to current converter 333. The voltage to current converter 333 converts a voltage signal into a current signal that may then be transmitted by the current signal transmitter 334 to the pad 328. In addition, the device 330 may also include a current to voltage converter 331 that is operable to convert a received current signal, received by the current signal receiver 332 via the pad 323, into a voltage signal.

The FIG. 3 shows one embodiment of the present invention where transmit and receive functionality between devices may be performed using multiple pad to pad (communicatively coupled via trace) interfaces. In addition, the FIG. 3 shows how the voltage to current and current to voltage functionality may be situated within the devices 310 and 330.

In certain embodiments employing CMOS devices and systems, the current signals received by the devices 310 and 330 have voltage swings of less than approximately ±100 mV. The voltage swings of the signals, that are now transmitted using current signals as oppose to voltage signals, provide for a significant reduction in voltage swing compared to the typical voltage swing of 0-3.3 V that is employed at the interfaces of many CMOS semiconductor devices and systems. This will assist in reducing distortion, introducing far less noise, and thereby enabling improved device and system performance.

Figure 4:
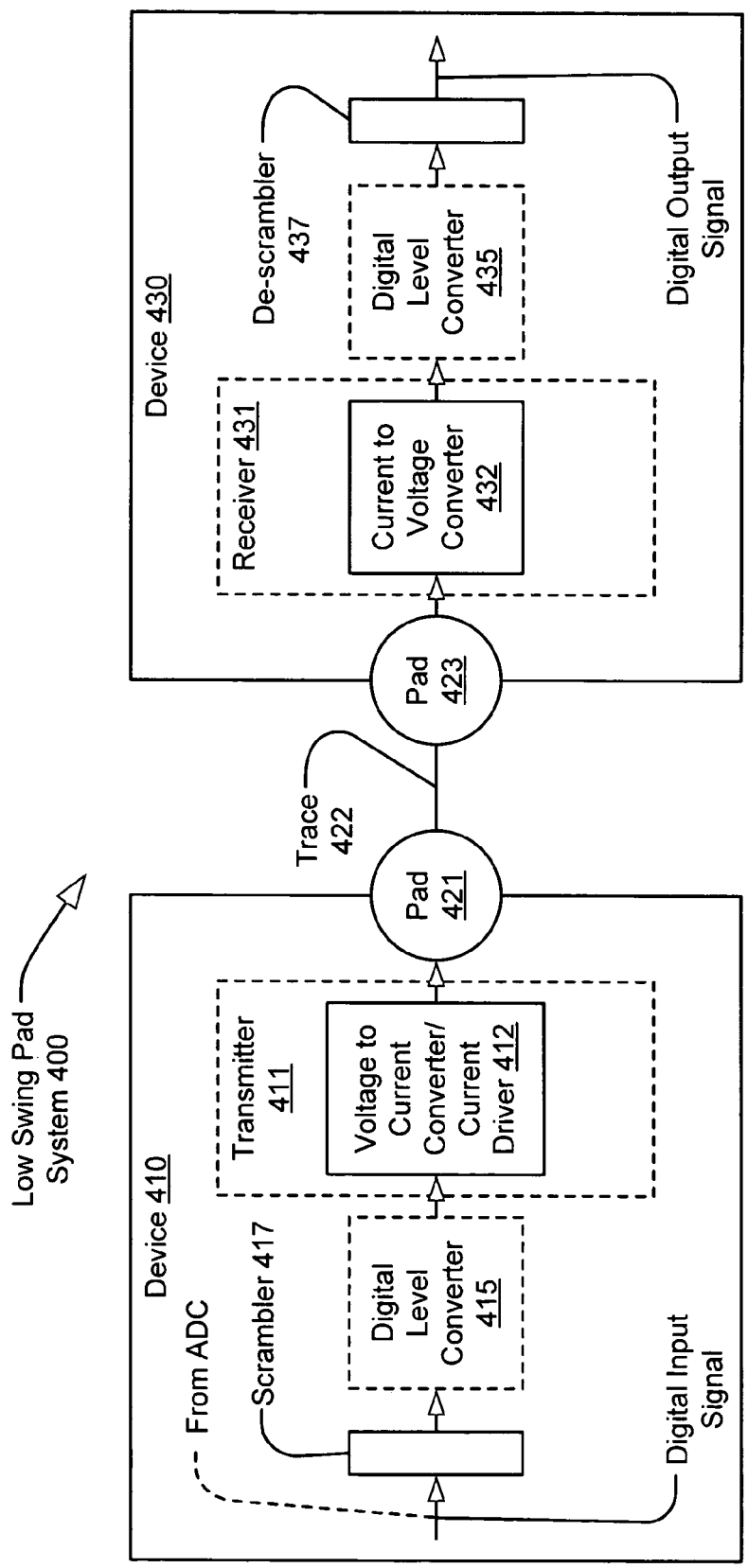
FIG. 4 is a system diagram illustrating another embodiment of a low swing pad system that is built in accordance with certain aspects of the present invention.

FIG. 4 is a system diagram illustrating another embodiment of a low swing pad system 400 that is built in accordance with certain aspects of the present invention. A device 410 communicatively couples to a device 430 via pads 421 and 423 that are communicatively coupled via a trace 422. For communication from the device 410 to the device 430, the device 410 pushes/pulls a current signal to a pad 421 that passes the current signal to a pad 423 via a trace 422; the pad 423 is located at the device 430.

A digital input signal, within the device 410, is provided to a scrambler 417. The operation of a digital signal scrambler 417, in the context of the present invention, will be appreciated when viewed in conjunction with the associated Figures and written description. The scrambler 417 will help reduce the deleterious effects introduced by signal dependent content of the data within the incoming signal by randomizing it, among other beneficial effects. The scrambler 417 outputs its scrambled signal to a digital level converter 415. It is also noted that the digital level converter 415 is not needed in all embodiments. The analog signal is then passed to a voltage to current converter/current driver 412. The voltage to current converter/current driver 412 may be contained within a transmitter 411. The voltage to current converter/current driver 412 pushes/pulls the current signal to the pad 421. The current signal is passed from the pad 421, across the trace 422, to the pad 423.

The device 430 receives the current signal from the pad 423 and passes it to a current to voltage converter 432. The current to voltage converter 432 may be included within a receiver 431 within the device 430. The voltage signal, output from the current to voltage converter 432, is provided to digital level converter 435. It is also noted that the digital level converter 435 is not needed in all embodiments. The digital signal output from the digital level converter 435 is provided to a de-scrambler 437. The de-scrambler 437 will then provide this de-scrambled, digital output signal to any additional functional blocks within the device 430.

The device 410 and the device 430 may also include the complementary functionality of transmit/receive without departing from the scope and spirit of the invention. For example, the device 410 may include receiver functionality, and the device 430 may include transmitter functionality in certain embodiments. For example, functional blocks comparable to each of the functional blocks located within the device 410 may also be located within the device 430 and vice versa without departing from the scope and spirit of the invention.

Figure 5:
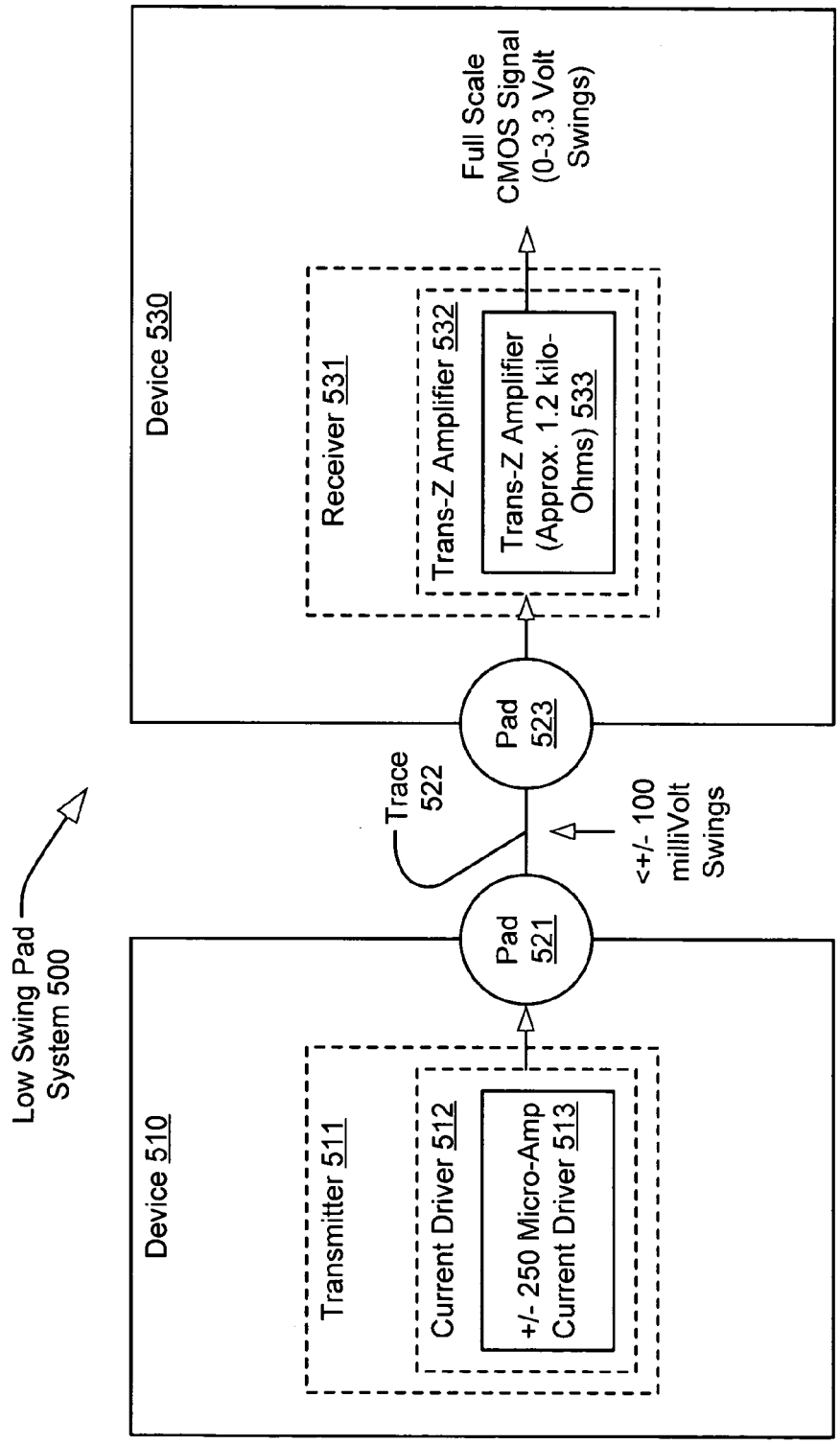
FIG. 5 is a system diagram illustrating another embodiment of a low swing pad system that is built in accordance with certain aspects of the present invention.

FIG. 5 is a system diagram illustrating another embodiment of a low swing pad system 500 that is built in accordance with certain aspects of the present invention. A device 510 communicatively couples to a device 530 via pads 521 and 523 that are communicatively coupled via a trace 522. For communication from the device 510 to the device 530, the device 510 pushes/pulls a current signal to a pad 521 that passes the current signal to a pad 523 via a trace 522; the pad 523 is located at the device 530.

The device 510 includes a current driver 512. In certain embodiments, the current driver 512 includes a current driver 513 that is operable to deliver a current having a current range/swing of approximately ±250 micro-Amps (μA). However, the particular current rating value of the current driver may be altered without departing from the scope and spirit of the invention. In certain embodiments, the current driver 512/the current driver 513 is included within a transmitter 511 within the device 510.

In certain embodiments employing CMOS devices and systems, the current signal transmitted by the device 510 has voltage swings of less than approximately ±100 mV. The voltage swings of these current signals (according to the present invention) are significantly smaller than the voltage swings that are generated within systems using voltage signals of 0-3.3 V that are employed at the interfaces of many prior art CMOS semiconductor devices and systems. This will assist in reducing distortion, introducing far less noise, and thereby enabling improved device and system performance.

The device 531 includes a trans-impedance amplifier 532. In certain embodiments, the trans-impedance amplifier 432 includes a trans-impedance amplifier 533 that includes a feedback resistor (Rfb) of approximately 1.2 kilo-Ohms (kΩ). However, the particular amplification rating value of the trans-impedance amplifier 533 may be altered without departing from the scope and spirit of the invention. In certain embodiments, the trans-impedance amplifier 532/trans-impedance amplifier 533 is included within a receiver 531. The receiver 531 is operable to provide a full-scale CMOS voltage signal having a swing of approximately 0-3.3 V. The level of this full-scale CMOS voltage signal may be modified using a level translator as will be shown in some of the other embodiments.

Figure 6:
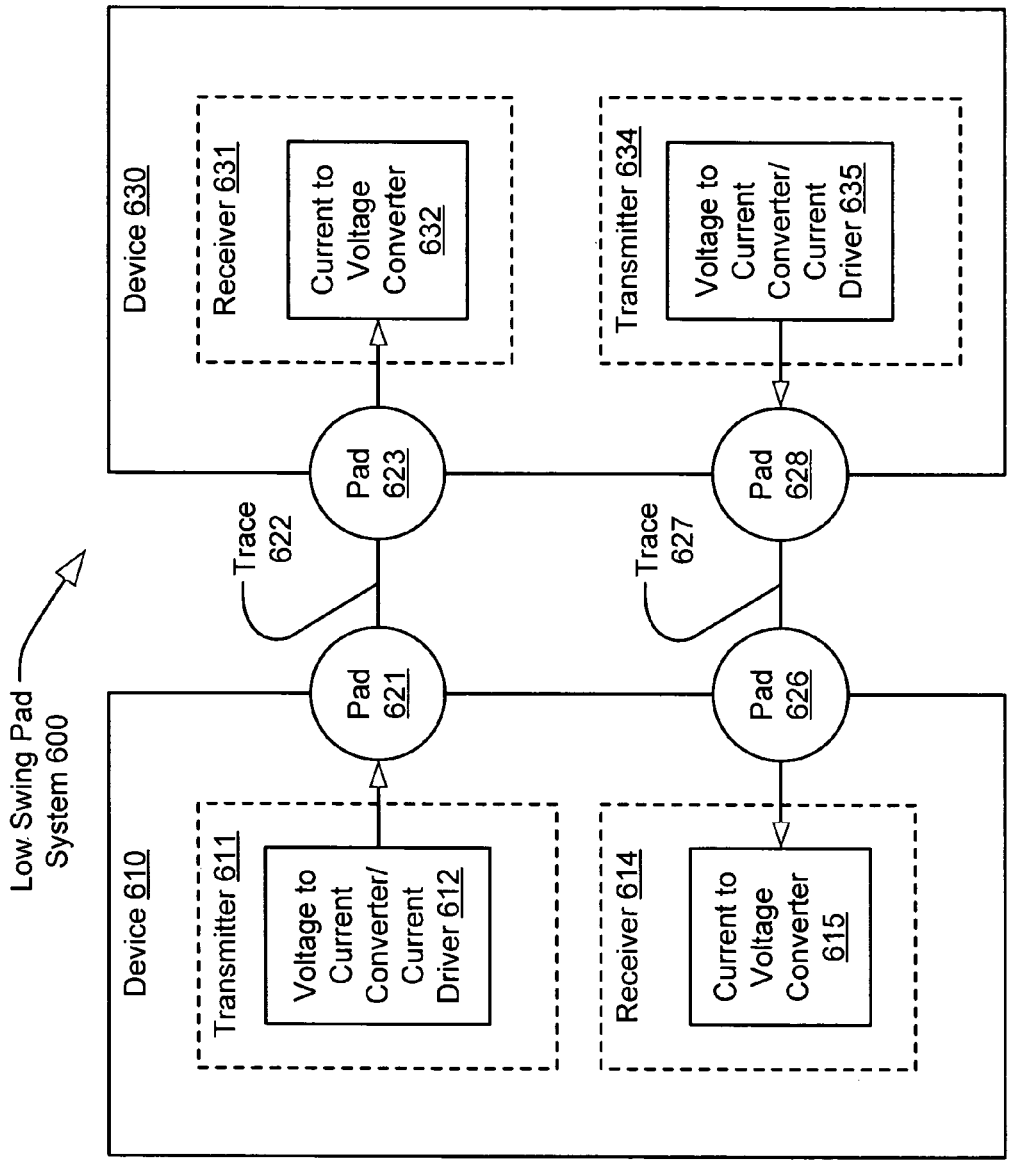
FIG. 6 is a system diagram illustrating another embodiment of a low swing pad system that is built in accordance with certain aspects of the present invention.

FIG. 6 is a system diagram illustrating another embodiment of a low swing pad system 600 that is built in accordance with certain aspects of the present invention. A device 610 communicatively couples to a device 630 via pads and traces. For communication from the device 610 to the device 630, the device 610 pushes/pulls a current signal to a pad 621 that passes the current signal to a pad 623 via a trace 622; the pad 623 is located at the device 630. Analogously, for communication from the device 630 to the device 610, the device 630 pushes/pulls a current signal to a pad 628 that passes the current signal to a pad 626 via a trace 627; the pad 626 is located at the device 630.

For transmission from the device 610, a transmitter 611 provides the current signal to the pad 621; the transmitter 611 employs a voltage to current converter/current driver 612 to generate and push/pull the current signal to the pad 621. For transmission from the device 630, a transmitter 634 provides the current signal to the pad 628; the transmitter 634 employs a voltage to current converter/current driver 635 to generate and push/pull the current signal to the pad 628. Within the device 610, for receipt of a current signal that has been transmitted from the device 630, a receiver 631 is employed; the receiver 631 is communicatively coupled to the pad 623; and the receiver 631 employs a current to voltage converter 632 to convert the received current signal into a voltage signal. Within the device 630, for receipt of a current signal that has been transmitted from the device 610, a receiver 614 is employed; the receiver 614 is communicatively coupled to the pad 626; and the receiver 614 employs a current to voltage converter 615 to convert the received current signal into a voltage signal.

The FIG. 6 shows one embodiment of the present invention where transmit and receive functionality between devices may be performed using multiple pad to pad (communicatively coupled via trace) interfaces.

In certain embodiments employing CMOS devices and systems, the current signals received by the devices 610 and 630 have voltage swings of less than approximately ±100 mV. The voltage swings of the signals, that are now transmitted using current signals as oppose to voltage signals, provide for a significant reduction in voltage swing compared to the typical voltage swing of 0-3.3 V that is employed at the interfaces of many CMOS semiconductor devices and systems. This will assist in reducing distortion, introducing far less noise, and thereby enabling improved device and system performance.

Figure 7:
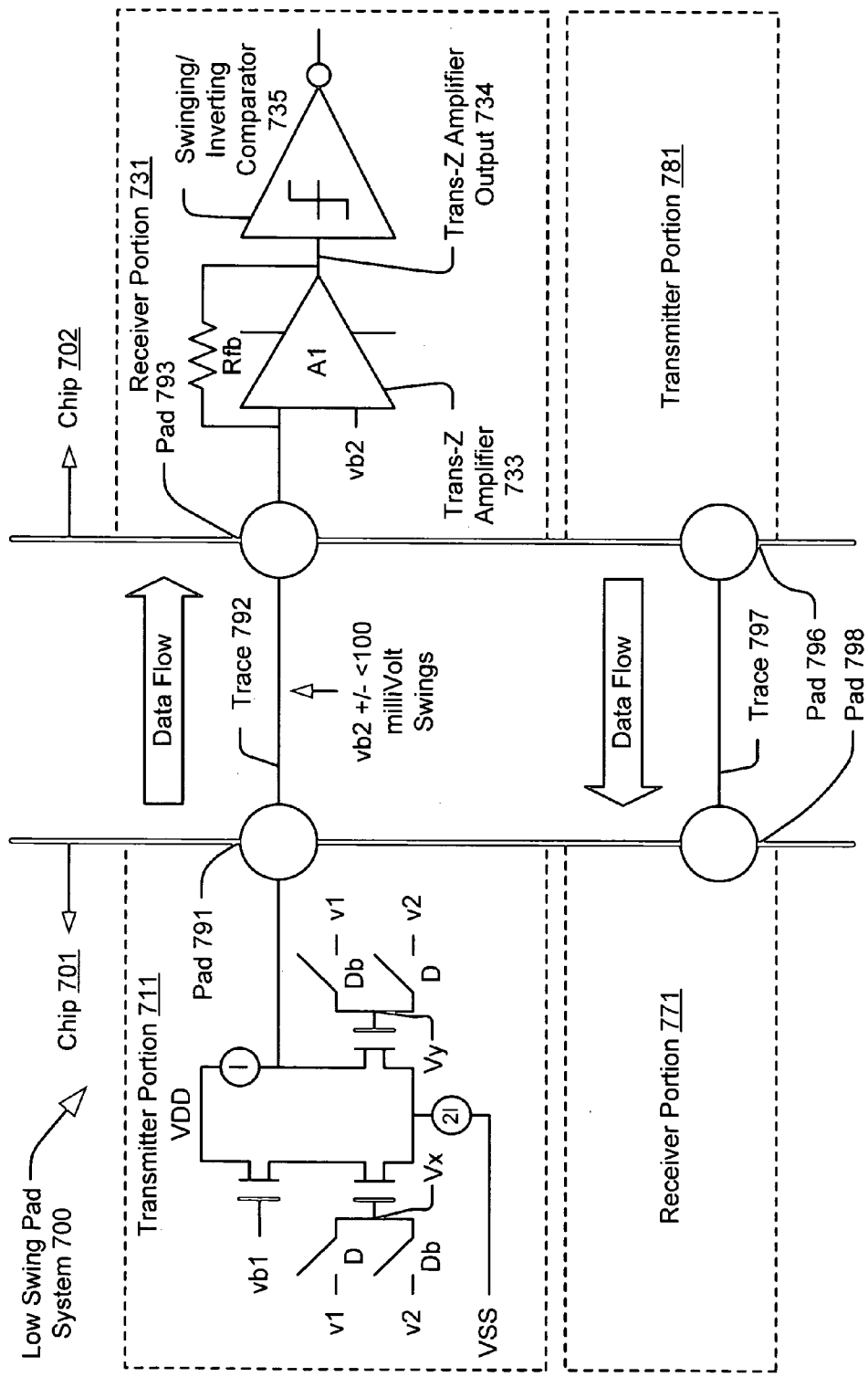
FIG. 7 is a system diagram illustrating another embodiment of a low swing pad system that is built in accordance with certain aspects of the present invention.

FIG. 7 is a system diagram illustrating another embodiment of a low swing pad system 700 that is built in accordance with certain aspects of the present invention. The low swing pad system 700 provides for interfacing between a semiconductor chip 701 and a semiconductor chip 702. The semiconductor chip 701 includes a transmitter portion 711, and the semiconductor chip 702 includes a receiver portion 731.

The transmitter portion 711 of the semiconductor chip 701 pushes/pulls a current signal I to a pad 791 that passes the current signal to a pad 793 via a trace 792 that communicatively couples to the receiver portion 731 of the semiconductor chip 702.

The transmitter portion 711 includes a dual voltage input pair v1 and v2 that are employed either to push/pull the current I to the pad 791 or pull current I from the pad 791; in this embodiment, it is assumed that v1>v2. The difference between v1 and v2 is, by design, sufficiently large to ensure that the current is completely steered in one of the devices of the differential pair. The voltage vb1 is used to bias the top left device within the transmitter portion 711 and the voltage sources VDD and VSS are used to supply high and low voltage bias points to the transmitter portion 711. In certain embodiments, the VDD voltage is the full-scale CMOS voltage signal of 3.3 V. When data is provided to the transmitter portion 711 in the form of D and Db (D-bar, the logical complement of D), the switches are controlled to the two control devices within the transmitter portion 711.

The controlling of the switches controls the pushing and pulling of current through the interface between transmitter portion 711 of the semiconductor chip 701 and the receiver portion 731 of the semiconductor chip 702 via the pads 791 and 793 and the trace 792. When Vx>Vy, then current will be pushed out of the pad 791 and across the trace 792; when Vx<Vy, then current will be pulled from the pad 791. This control of the switches governs the passing of data through the interface between transmitter portion 711 of the semiconductor chip 701 and the receiver portion 731 of the semiconductor chip 702.

The low swing pad system 700 is operable to employ a serial low swing current-mode interface which significantly reducing the voltage swing on the output pads. In other embodiments, digital data output from an ADC is applied to the data (D) input of a transmit circuitry. The complement of the data (D-bar, or Db) is also employed. If D is high, then the current I is pushed out through the output pad; alternatively, if D is low, then a current I is pulled in from the output pad. This illustrates the push/pull operation of the transmitter portion 711 within the low swing pad system 700.

The current mode information is converted back to voltage either on a second chip (the chip 702) if this interface is used to communicate between chips or it is converted back to a voltage with external circuitry on a board that may be used to test the chip 701. Within the embodiment shown in the FIG. 7, this is performed within the chip 702, specifically within the receiver portion 731 of the chip 702. The circuit used to do this I to V conversion is the trans-impedance amplifier 733 amplifier. The output of this trans-impedance amplifier 733 is a signal with the voltage amplitude of +/−IRfb (where Rfb is the feedback resistor of the trans-impedance amplifier 733). This signal is then converted to CMOS levels using a swinging/inverting comparator 735.

At the receiver portion 731 of the semiconductor chip 702, the trans-impedance amplifier 733, having a finite loop gain A1 and employing a feedback resistor (Rfb), converts the received current signal and converts it into a voltage signal. In some embodiments, the value of the Rfb is approximately 1.2 kilo-Ohms (kΩ). The trans-impedance amplifier 733 is biased using a voltage of vb2. The designer selected values for the current to be pushed/pulled to the pad 791 may be different in different embodiments. For example, any desired current may be selected. It is noted that as the desired operating bandwidth (or symbol rate) increases, then the required current value will likewise increase. The voltage of the trace 792 will be held at the voltage bias of vb2, and it will vary at approximately as vb2 ±100 mV; that is to say, the DC offset of the trace 792 will be the voltage of vb2, and it will experience swings of less than approximately ±100 mV.

Again, the trans-impedance amplifier 733 has a finite loop gain of A1; the value of A1 determines the residual signal swing on the pad 793 and hence across the trace 792. This is approximately equal to +/−IRfb/A1. For an ideal amplifier the gain A1 would be extremely large (the theoretical model would be infinite), and hence the residual swing on the pad 793 would then be almost zero. This would completely eliminate the signal dependant noise source at the pad.

The voltage swing at the output of the trans-impedance amplifier 733 (shown as reference numeral 734) will vary with respect to the value Rfb and the current value chosen within the transmitter portion 711. To maintain an ideally small voltage swing at the trace 792, the loop gain A1 of the trans-impedance amplifier 733 should be kept substantially large. It is also noted that the finite loop gain A1 of the trans-impedance amplifier 733 may result in some small amount of undesirable voltage swing simply due to the finite effects of these elements; the design may be implemented such that the inherent voltage swing generated due to the finite loop gain effects of the trans-impedance amplifier 733 may be below a ±100 mV swing level. The level of sophistication of the implementation of the trans-impedance amplifier 733 may be changed without departing from the scope and spirit of the invention. The implementation of the low voltage swing interface between the chip 701 and the chip 702 will be realized.

Within one particular design embodiment, for simplicity in terms of power and area, the receiver portion 731 proposed for the trans-impedance amplifier 733 is a CMOS inverter with Rfb in feedback. This circuit has limited gain A1 of ~10 which results in an actual residual swing on the pads of approximately ±100-200 mV. The net result is a greater than an order of magnitude reduction in the source of substrate noise when compared to the 3.3 V CMOS I/O levels associated with standard CMOS pads. This implementation provides for a number of advantages. Some advantages include low signal content at the pads 791 and 792 as well as across the trace 793. In addition, the single ended operation results in a need for only 1 pad per signal as opposed to a differential interface, employed within many prior art systems that require two different pads for each signal path; such differential interface prior art systems would require 4 pads to accommodate both the transmit and receive paths. One such prior art approach using this differential approach is the LVDS approach that requires 2 pads per signal. The LVDS is the Low-Voltage Differential Signal [IEEE 1596.3 specification].

The voltage swings seen at the trace 792, and clearly also at the pads 791 and 792, will be significantly less than would be seen using prior art interfacing techniques between the chip 701 and the chip 702. This voltage signal output from the trans-impedance amplifier 733 is provided to a swinging/inverting comparator 735 to generate a single bit digital output signal. This output may then be provided to a number of other functional blocks that may be included within the semiconductor chip 702.

The various voltages vb1, vb2, v1, v2, VSS, VDD, the threshold voltages used by the swinging/inverting comparator 735 to make comparison of its received voltage signal, as well as the convention of D and Db (D-bar)— which is high and which is low—may all be selected and modified by a design implementer to accommodate the particular application at hand.

The semiconductor chips 701 and 702 may be viewed as being various types of semiconductor devices without departing from the scope and spirit of the invention. For example, in certain embodiments, the semiconductor chip 701 may be viewed as being an AFE functional chip, and the semiconductor chip 702 may be viewed as being a DSP functional chip.

It is also noted that the device 710 and the device 730 may also include the complementary functionality of transmit/ receive without departing from the scope and spirit of the invention. For example, the device 710 may also include a receiver portion 771, and the device 730 may also include a transmitter portion 781 in certain embodiments. The data flow would be opposite the direction of data flow from the transmitter portion 711 to the receiver portion 731 described above. The transmitter portion 781 of the semiconductor chip 702 would push/pull a current signal to a pad 796 that would pass the current signal to a pad 798 via a trace 797 that communicatively couples to the receiver portion 771 of the semiconductor chip 701. For example, functional blocks comparable to each of the functional blocks located within the device 710 may also be located within the device 730 and vice versa without departing from the scope and spirit of the invention.

Figure 8:
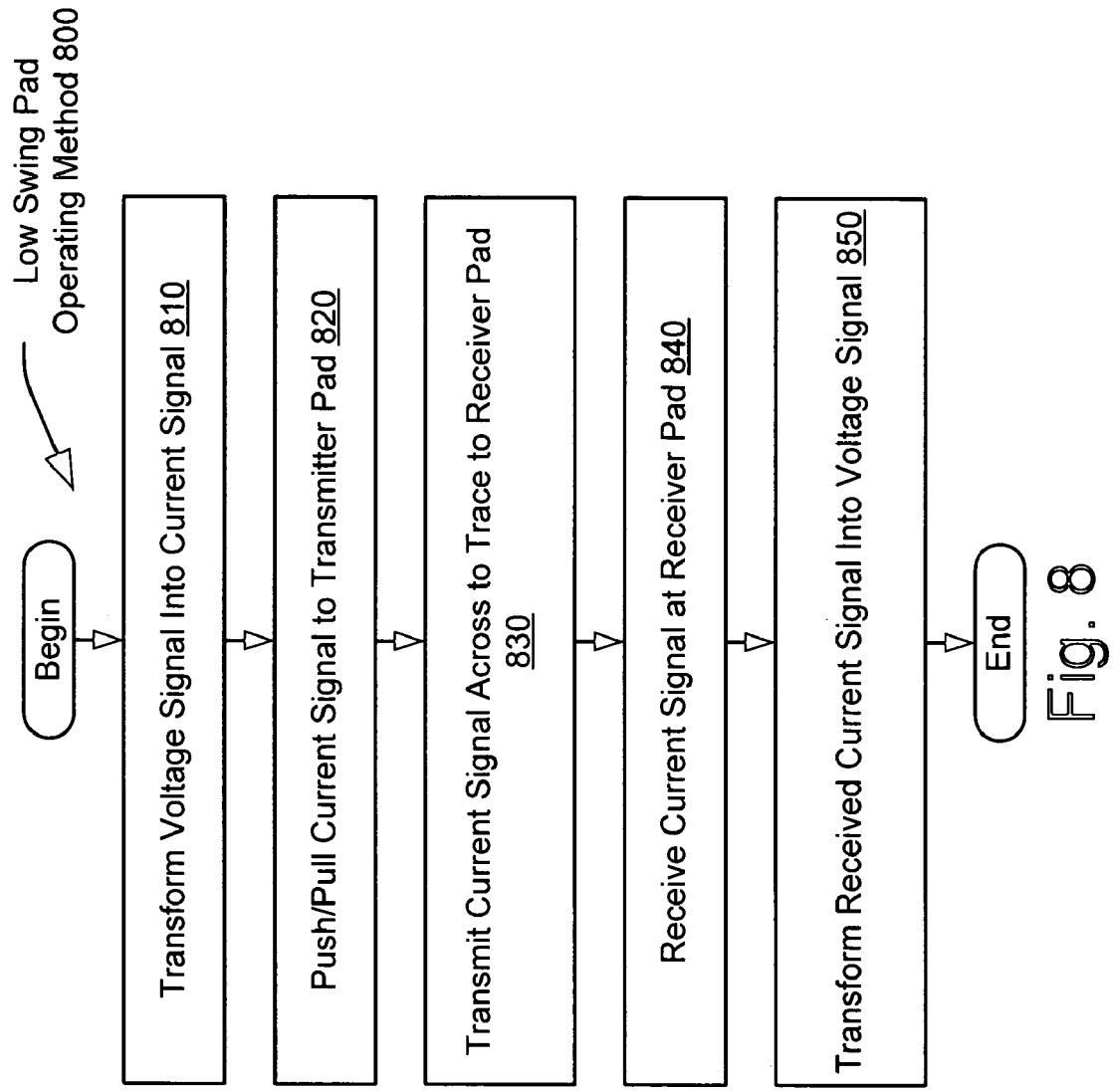
FIG. 8 is an operational flow diagram illustrating an embodiment of a low swing pad operating method that is performed in accordance with certain aspects of the present invention.

FIG. 8 is an operational flow diagram illustrating an embodiment of a low swing pad operating method 800 that is performed in accordance with certain aspects of the present invention. In a block 810, a voltage signal is transformed into a current signal. This current signal is then pushed/pulled to a transmit pad in a block 820. The current signal is then transmitted across a trace to a receiver pad in a block 830; this operation may be performed by transmitting the current signal from one device to another device. Then, in a block 840, the current signal is received at the receiver pad in a block 840. This current signal is then transformed into a voltage signal in a block 850.

Figure 9:
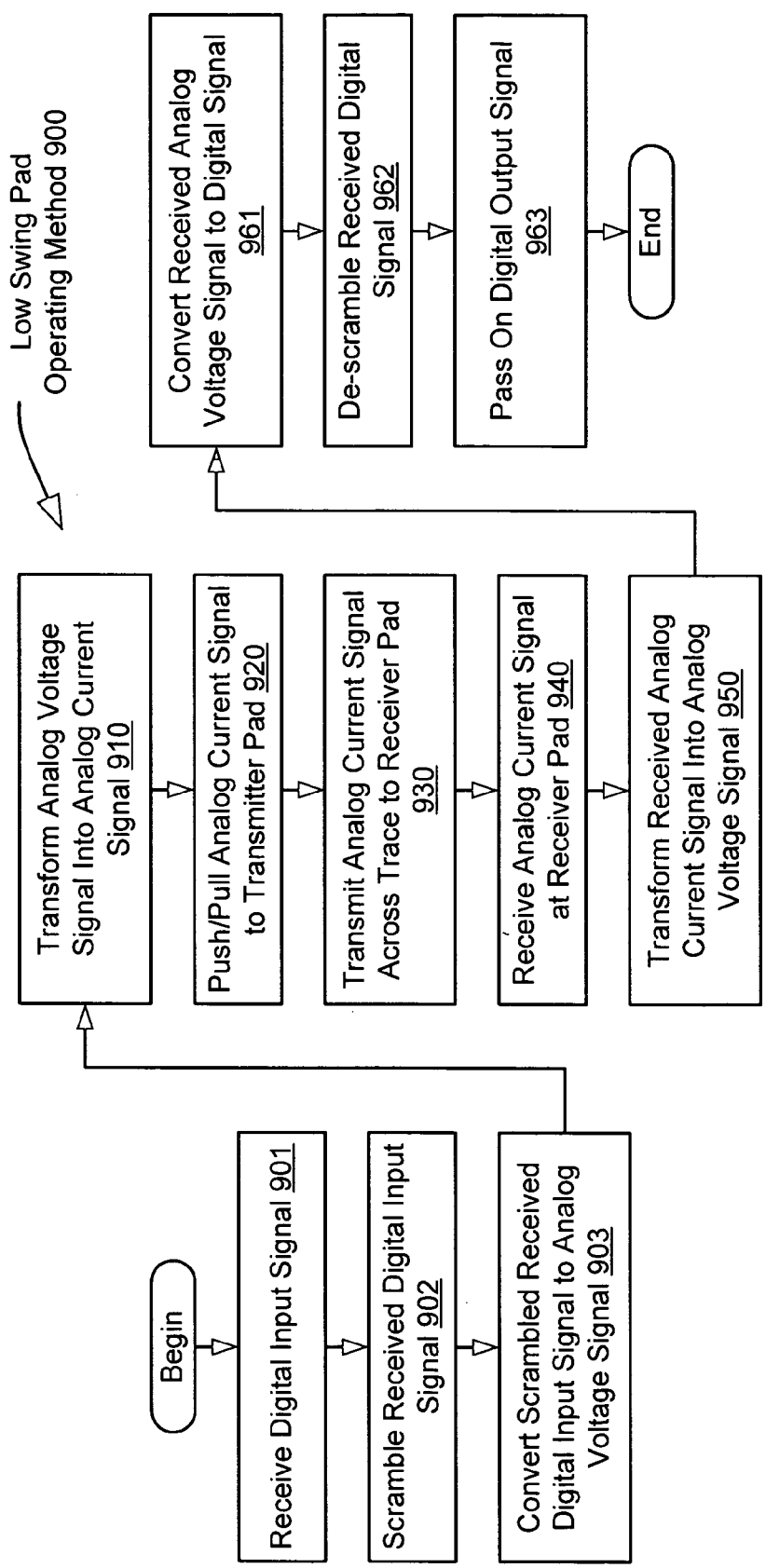
FIG. 9 is an operational flow diagram illustrating another embodiment of a low swing pad operating method that is performed in accordance with certain aspects of the present invention.

FIG. 9 is an operational flow diagram illustrating another embodiment of a low swing pad operating method 900 that is performed in accordance with certain aspects of the present invention. In certain embodiments, all of the operations described within the FIG. 9 may be performed at a low voltage level with respect to full-scale CMOS voltage levels. This low voltage level may include 0-1.8 V voltage signal levels as opposed the nominal full-scale voltage levels of 0-3.3 V.

In a block 901, a digital input signal is received. The received digital input signal is scrambled in a block 902. Then, the scrambled received digital input signal is converted to an analog voltage signal in a block 903.

Then, in a block 910, a analog voltage signal is transformed into an analog current signal. This analog current signal is then pushed/pulled to a transmit pad in a block 920. The analog current signal is then transmitted across a trace to a receiver pad in a block 930; this operation may be performed by transmitting the current signal from one device to another device. Then, in a block 940, the analog current signal is received at the receiver pad in a block 940. This analog current signal is then transformed into an analog voltage signal in a block 950.

In a block 961, the received analog voltage signal is converted to a digital signal. Then, in a block 962, the received digital signal is de-scrambled; the de-scrambling in the block 962 operates using knowledge of the particular manner and type of scrambling that is performed in the block 903. Ultimately, in a block 963, the digital output signal is passed on to any other processing operations that need be performed within a device or system.

Figure 10:
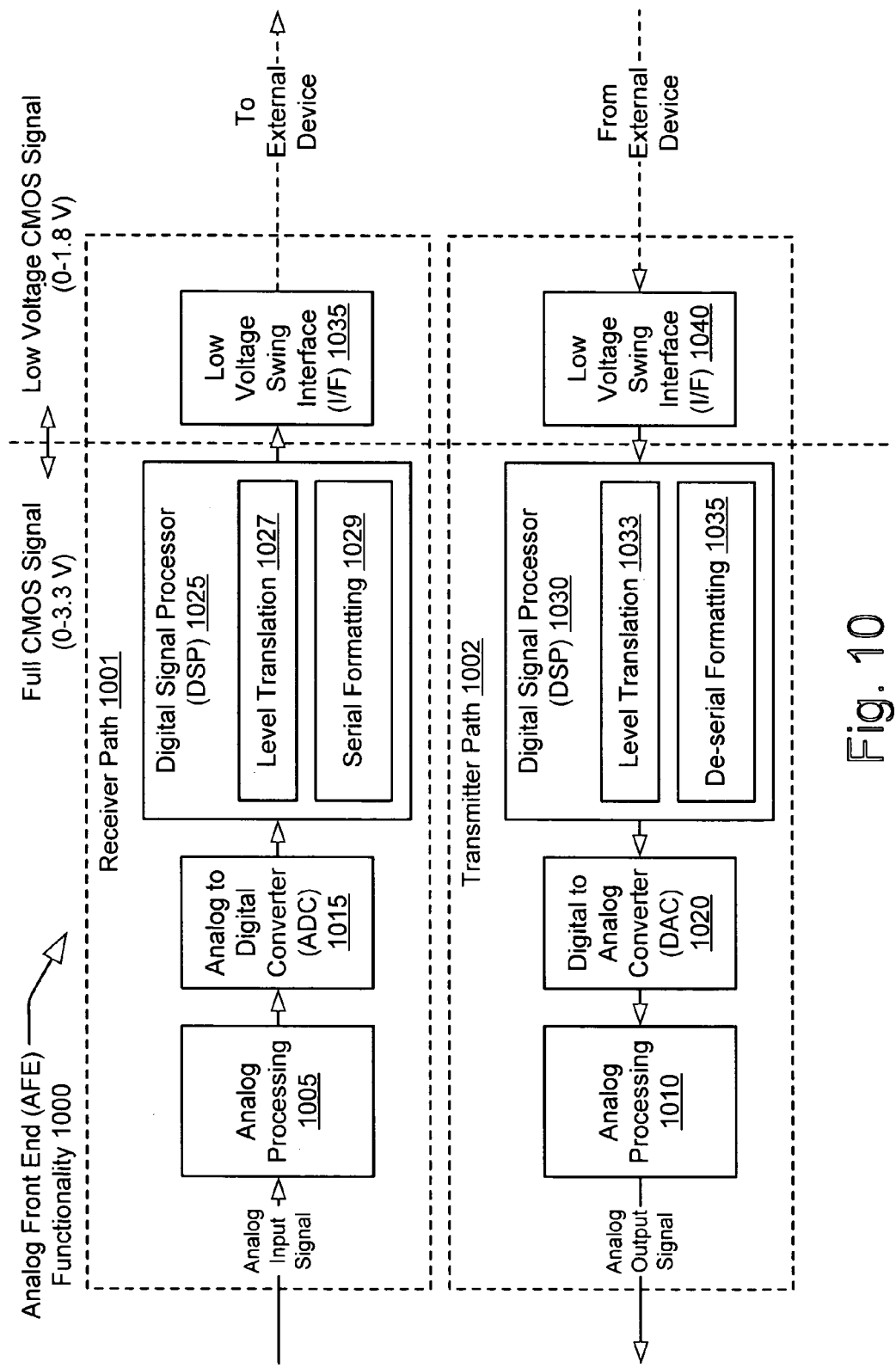
FIG. 10 is a functional block diagram illustrating an embodiment of AFE functionality that operates in accordance with certain aspects of the present invention.

FIG. 10 is a functional block diagram illustrating an embodiment of AFE functionality 1000 that operates in accordance with certain aspects of the present invention. The AFE functionality 1000 includes both a receiver path 1001 and a transmitter path 1002. A portion of each of the receiver path 1001 and the transmitter path 1002 operates at a higher CMOS voltage, and a portion operates at a lower CMOS voltage. In certain embodiments, the full-scale CMOS signal employs a 0-3.3 V swing, and the low voltage CMOS signal employs a 0-1.8 V swing.

Within the receiver path 1001, an analog input signal is provided to an analog processing functional block 1005; this analog processing 1005 may include limiting, amplification, filtering, and other analog processing as well. After performing the analog processing 1005, the signal is provided to an ADC 1015. The digital output signal from the ADC 1015 is proved to a DSP functional block 1025. The DSP 1025 may perform level translation as shown in a functional block 1027 and serial formatting as shown in a functional block 1029. This level translated, serial digital output signal is provided to a low voltage swing interface (I/F) 1035. The low voltage swing I/F 1035 is operable to interface with an external device. In certain embodiments, the higher voltage levels up to the low voltage swing I/F 1035 include the full-scale CMOS voltage swings of 0-3.3 V, and the lower voltage levels after the low voltage swing I/F 1035 include the low voltage CMOS voltage swings of 0-1.8 V. The low voltage swing I/F 1035 is operable to perform data communication using a current signal in accordance with any of the various embodiments described herein, thereby provided a very lower voltage swing at the interface to an external device.

The operation of the transmitter path 1002 is very analogous to the operation of the receiver path 1001, yet in the reverse operation. For example, a low voltage digital signal is received from an external device. This low voltage digital signal is provided to a low voltage swing I/F 1040. The low voltage swing I/F 1040 is operable to perform data communication using a current signal in accordance with any of the various embodiments described herein, thereby provided a very lower voltage swing at the interface to an external device. The output from the low voltage swing I/F 1040 is provided to a DSP functional block 1030. The DSP 1030 may perform level translation (from low to high CMOS voltage level) as shown in a functional block 1033 and de-serial formatting as shown in a functional block 1035. This level translated, de-serialized digital output signal provided to a DAC 1020. The analog output signal from the DAC 1020 is provided to an analog processing functional block 1010 from which an analog signal may be output and ready for transmission. The analog processing 1010 may include limiting, amplification, filtering, and other analog processing as well.

The FIG. 10 shows an embodiment where the functionality within a device may be partitioned into a lower voltage CMOS signal region (0-1.8 V in this embodiment) and a full CMOS signal region (0-3.3 V in this embodiment). The interfacing within the lower voltage CMOS signal region may be performed without needing to perform any translation of data to a higher full-scale CMOS signal.

Figure 11:
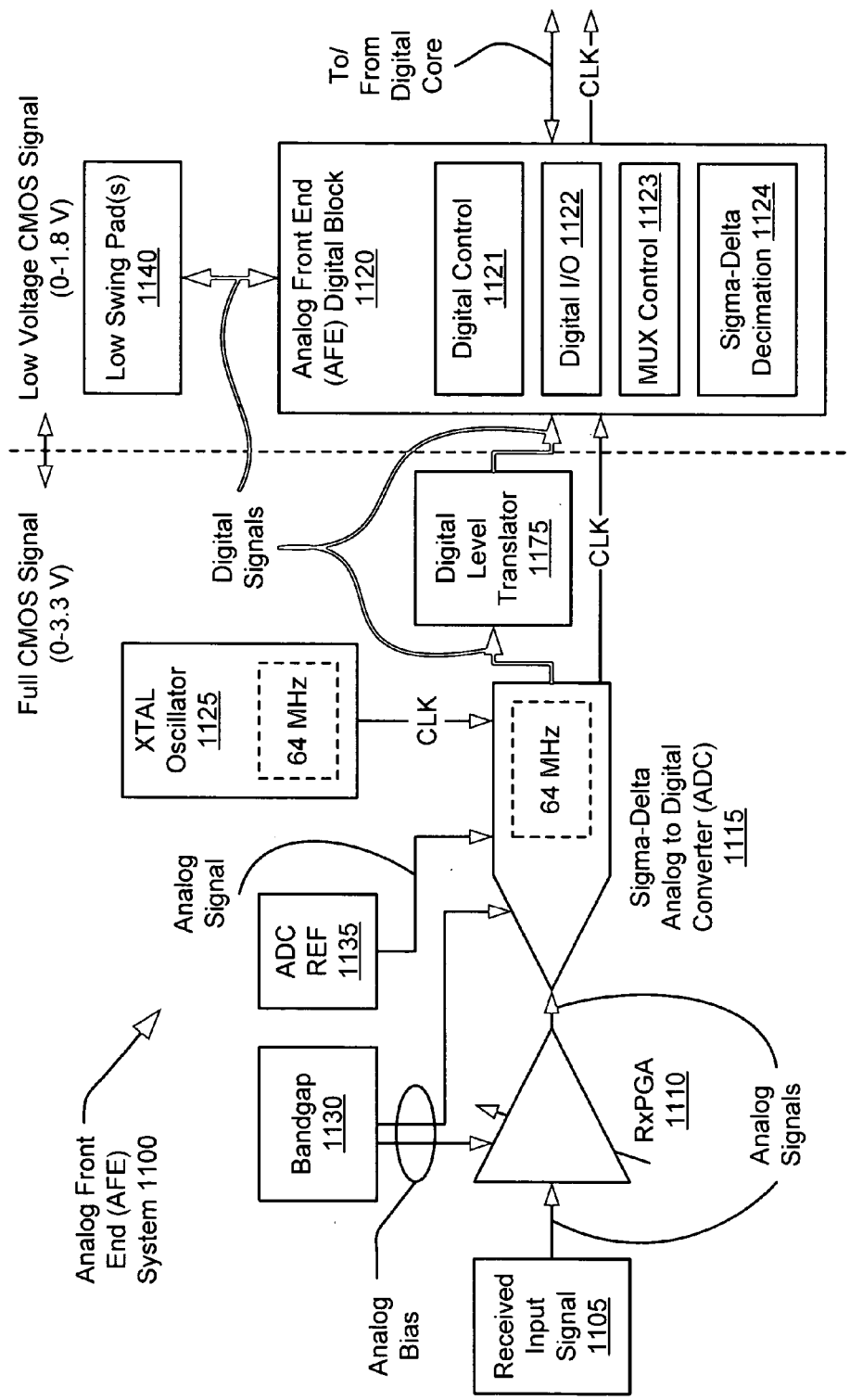
FIG. 11 is a system diagram illustrating an embodiment of an AFE system that is built in accordance with certain aspects of the present invention.

FIG. 11 is a system diagram illustrating an embodiment of an AFE system 1100 that is built in accordance with certain aspects of the present invention. A received input signal 1105 is provided to a receive programmable gain amplifier (RxPGA) 1110 that is operable to selectively amplify the received input signal 1105. The input and output of the RxPGA 1110 are analog signals. The output of the RxPGA 1110 is provided to a sigma-delta (ΣΔ) ADC 1115. An ADC reference 1135 may be provided to ΣΔ ADC 111 to provide a reference voltage from which to operate as well. The ΣΔ ADC 1115 operates using a CLK of 64 MHz in certain embodiments. The CLK is provided by an XTAL oscillator 1125. A bandgap 1130 provides an analog bias to both the RxPGA 1110 and the ΣΔ ADC 1115. The ΣΔ ADC 1115 then generates a digital signal that is provided to a digital level translator 1175 that translates from a full-scale CMOS signal to a low voltage CMOS signal. In certain embodiments, the full-scale CMOS signal employs a 0-3.3 V swing, and the low voltage CMOS signal employs a 0-1.8 V swing. However, other embodiments of input voltage level the output voltage level from the digital level translator 1175 may be employed without departing from the scope and spirit of the invention. From one perspective, a higher voltage level input is provided to the digital level translator 1175, and a lower voltage level is output from the digital level translator 1175.

The lower voltage signal from the digital level translator 1175 is provided to an AFE digital block 1120. In addition, the ΣΔ ADC 1115 provides the CLK to the AFE digital block 1120. The AFE digital block 1120 performs a number of functions including digital control 1121, digital input output (I/O) 1122, MUX control 1123, and ΣΔ decimation 1124. The AFE digital block 1120 interfaces with one or more low swing pads 1140. The low swing pads 140 operate within the lower CMOS voltage swing environment. The AFE digital block 1120 also performs the interfacing with the digital core and also passes the CLK forward as well. The digital core may include a number of functional devices including DSPs, registers, MACs, PHYs, peripheral buses, timers, and other digital functionality without departing from the scope and spirit of the invention.

The present invention provides for an embodiment where the interfacing via the low swing pads 1140 may be performed without having first to translate back up to a higher CMOS voltage level as is performed within many prior art systems. The interfacing provided by the low swing pads 1140 provides for an efficient and low noise manner in which to perform interfacing.

Figure 12:
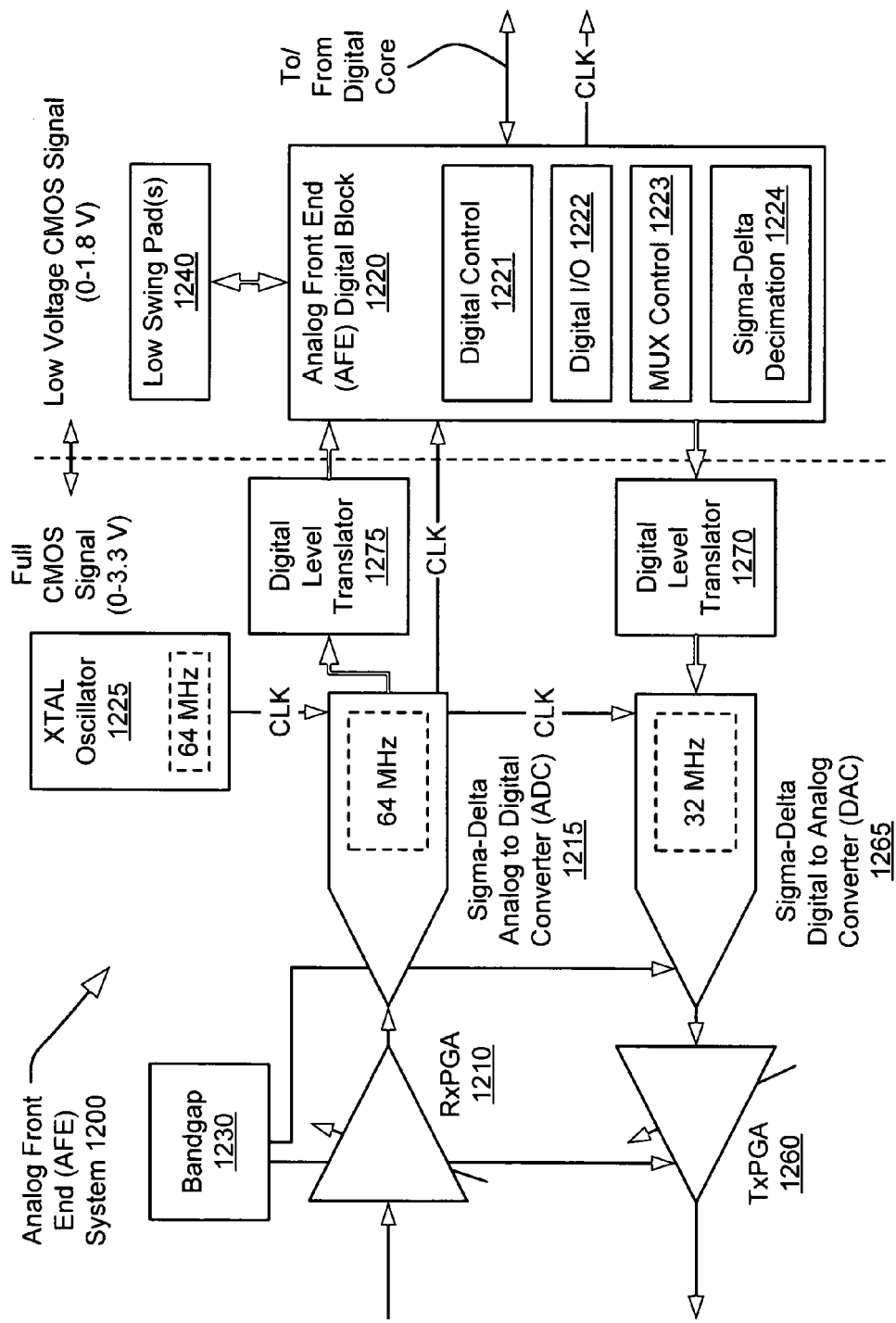
FIG. 12 is a system diagram illustrating another embodiment of an AFE system that is built in accordance with certain aspects of the present invention.

FIG. 12 is a system diagram illustrating another embodiment of an AFE system 1200 that is built in accordance with certain aspects of the present invention. From certain perspectives, the AFE system 1200 may be viewed as being an extension of the AFE system 1100 of the FIG. 11 that also include a transmitter path as well as a receiver path.

A received input signal is provided to a receive programmable gain amplifier (RxPGA) 1210 that is operable to selectively amplify the received input signal. The input and output of the RxPGA 1210 are analog signals. The output of the RxPGA 1210 is provided to a ΣΔ ADC 1215. An ADC reference may also be provided to ΣΔ ADC 121 to provide a reference voltage from which to operate as well. The ΣΔ ADC 1215 operates using a CLK of 64 MHz in certain embodiments. The CLK is provided by an XTAL oscillator 1225. A bandgap 1230 provides an analog bias to both the RxPGA 1210 and the ΣΔ ADC 1215. The ΣΔ ADC 1215 then generates a digital signal that is provided to a digital level translator 1275 that translates from a full-scale CMOS signal to a low voltage CMOS signal. In certain embodiments, the full-scale CMOS signal employs a 0-3.3 V swing, and the low voltage CMOS signal employs a 0-1.8 V swing. However, other embodiments of input voltage level the output voltage level from the digital level translator 1275 may be employed without departing from the scope and spirit of the invention. From one perspective, a higher voltage level input is provided to the digital level translator 1275, and a lower voltage level is output from the digital level translator 1275.

The lower voltage signal from the digital level translator 1275 is provided to an AFE digital block 1220. In addition, the ΣΔ ADC 1215 provides the CLK to the AFE digital block 1220. The AFE digital block 1220 performs a number of functions including digital control 1221, digital input output (I/O) 1222, MUX control 1223, and ΣΔ decimation 1224. The AFE digital block 1220 interfaces with one or more low swing pads 1240. The low swing pads 140 operate within the lower CMOS voltage swing environment. The AFE digital block 1220 also performs the interfacing with the digital core and also passes the CLK forward as well. The digital core may include a number of functional devices including DSPs, registers, MACs, PHYs, peripheral buses, timers, and other digital functionality without departing from the scope and spirit of the invention.

The present invention provides for an embodiment where the interfacing via the low swing pads 1240 may be performed without having first to translate back up to a higher CMOS voltage level as is performed within many prior art systems. The interfacing provided by the low swing pads 1240 provides for an efficient and low noise manner in which to perform interfacing.

The description above for the FIG. 12 may be associated with the receiver path of the AFE system 1200. The operation of the transmitter path within the AFE system 1200 is very analogous to the operation of the receiver path 1001, yet in the reverse operation. For example, a low voltage digital signal is received from the digital core, or alternatively, a low voltage digital signal is received via the low swing pads 1240, and the receive operation of the AFE system 1200 must operate for proper receipt and interfacing of that data.

The received signal is provided to a digital level translator 1270. The digital level translator 1270 translates from a low voltage CMOS signal to a full-scale CMOS signal. In certain embodiments, the full-scale CMOS signal employs a 0-3.3 V swing, and the low voltage CMOS signal employs a 0-1.8 V swing. However, other embodiments of input voltage level the output voltage level from the digital level translator 1270 may be employed without departing from the scope and spirit of the invention. From one perspective, a lower voltage level input is provided to the digital level translator 1270, and a higher voltage level is output from the digital level translator 1270.

The output from the digital level translator 1270 is provided to a ΣΔ DAC 1265. The ΣΔ DAC 1265 operates using a CLK of 32 MHz in certain embodiments. The now analog signal output from the ΣΔ DAC 1265 is then provided to a transmit programmable gain amplifier (TXPGA) 1210 from which an appropriately scaled analog signal may then be transmitted from the AFE system 1200. The bandgap 1230 also provides an analog bias to both the TxPGA 1260 and the ΣΔ DAC 1265.

In view of the above detailed description of the invention and associated drawings, other modifications and variations will now become apparent. It should also be apparent that such other modifications and variations may be effected without departing from the spirit and scope of the invention.

What is claimed is:

1. An apparatus, comprising:
   an integrated asynchronous digital subscriber line semiconductor chip that includes an analog front-end portion; and wherein:
   the analog front-end portion includes a transmitter portion, the transmitter portion being communicatively coupled to a transmitter pad; and
   the transmitter portion includes a voltage to current converter that is operable to convert a voltage signal to a current signal and to push/pull the current signal to the transmitter pad, from which the current signal is transmitted via a trace that is coupled to the transmitter pad.

2. The apparatus of claim 1, wherein:
   the current signal generated by the voltage to current converter of the transmitter includes a voltage swing less than approximately plus or minus 100 milli-Volts.

3. The apparatus of claim 1, wherein:
   the integrated asynchronous digital subscriber line semiconductor chip further includes a scrambler and a digital level converter;
   the scrambler receives a digital input signal and then generates a scrambled digital input signal; and
   the digital level converter converts a level of the scrambled digital input signal and provides the level convened scrambled digital input signal to the transmitter portion.

4. The apparatus of claim 3, wherein:
   a voltage level of the scrambled digital input signal is approximately 1.8 Volts; and
   a voltage level of the level converted scrambled digital input signal that is provided to the transmitter portion is approximately 3.3 Volts.

5. The apparatus of claim 1, wherein:
   the transmitter pad communicatively couples to another device via the trace.

6. An apparatus, comprising:
   an integrated asynchronous digital subscriber line semiconductor chip that includes an analog front-end portion; and wherein:

the analog front-end portion includes a receiver portion, the receiver portion being communicatively coupled to a receiver pad;
the receiver portion includes a current to voltage converter that is operable to receive a current signal from the receiver pad and to transform the received current signal to a voltage signal; and
the current signal is received at the receiver pad via a trace that couples to the receiver pad.

7. The apparatus of claim 6, wherein:
the current signal received by the current to voltage convener of the receiver portion includes a voltage swing less than approximately plus or minus 100 milli-Volts.

8. The apparatus of claim 6, wherein:
the receiver portion includes a digital level converter that is operable to convert the voltage signal from a first level to a second level; and
the first level has a voltage of approximately 3.3 Volts and the second level has a voltage of approximately 1.8 Volts.

9. The apparatus of claim 6, wherein:
the receiver portion includes a trans-impedance amplifier that is operable to receive the current signal and to transform the received current signal to the voltage signal; and
the voltage signal has a magnitude that is approximately 3.3 Volts.

10. The apparatus of claim 6, wherein:
the integrated asynchronous digital subscriber line semiconductor chip further includes a de-scrambler and a digital level converter;
the receiver portion provides the digital signal to the digital level converter;
the digital level converter receives the digital signal and changes a level of the digital signal; and
the de-scrambler receives the voltage level changed digital signal and then generates a de-scrambled digital output signal.

11. An apparatus, comprising:
a transmitter portion;
a transmitter pad that is communicatively coupled to the transmitter portion; and
wherein:
the transmitter portion includes a voltage to current converter that is operable to convert a voltage signal to a current signal and to push/pull the current signal to the transmitter pad, from which the current signal is transmitted via a trace that is coupled to the transmitter pad.

12. The apparatus of claim 11, wherein:
the current signal generated by the voltage to current converter of the transmitter portion includes a voltage swing less than approximately plus or minus 100 milli-Volts.

13. The apparatus of claim 11, wherein:
the semiconductor system further includes a scrambler and a digital level converter;
the scrambler receives a digital input signal and then generates a scrambled digital input signal; and
the digital level convener converts a level of the scrambled digital input signal and provides the level converted scrambled digital input signal to the transmitter portion.

14. The apparatus of claim 11, wherein:
the transmitter portion further includes a plurality of switches;
the controlling of the plurality of switches controls the pushing and pulling of the current signal to the transmitter pad.

15. The apparatus of claim 11, wherein:
the transmitter pad is communicatively coupled to a receiver pad via the trace.

16. An apparatus, comprising:
a receiver portion;
a receiver pad that is communicatively coupled to the receiver portion; and
wherein:
the receiver portion includes a current to voltage converter that is operable to receive a current signal from the receiver pad and to transform the received current signal to a voltage signal; and
the current signal is received at the receiver pad via a trace that couples to the receiver pad.

17. The apparatus of claim 16, wherein:
the current signal received by the current to voltage converter of the receiver portion includes a voltage swing less than approximately plus or minus 100 milli-Volts.

18. The apparatus of claim 16, wherein:
the receiver portion includes a digital level convener that is operable to convert the voltage signal from a first level to a second level; and
the first level has a voltage of approximately 3.3 Volts and the second level has a voltage of approximately 1.8 Volts.

19. The apparatus of claim 16, wherein:
the receiver portion includes a trans-impedance amplifier that is operable to receive the current signal and to transform the received current signal to the voltage signal; and
the voltage signal has a magnitude that is approximately 3.3 Volts.

20. The apparatus of claim 16, wherein:
the receiver pad is communicatively coupled to a transmitter pad via the trace.

* * * * *

UNITED STATES PATENT AND TRADEMARK OFFICE
CERTIFICATE OF CORRECTION

| | |
|---|---|
| PATENT NO. | : 7,305,045 B2 |
| APPLICATION NO. | : 10/926212 |
| DATED | : December 4, 2007 |
| INVENTOR(S) | : Sumant Ranganathan and Tom W. Kwan |

Page 1 of 1

It is certified that error appears in the above-identified patent and that said Letters Patent is hereby corrected as shown below:

Column 1, line 19: replace "now abandoned," with --now expired,--

Column 16, line 53, in Claim 3: replace "convened" with --converted--

Column 17, line 12, in Claim 7: replace "convener" with --converter--

Column 18, line 6, in Claim 13: replace "convener" with --converter--

Column 18, line 37, in Claim 18: replace "convener" with --converter--

Signed and Sealed this

Twenty-second Day of July, 2008

JON W. DUDAS
*Director of the United States Patent and Trademark Office*